United States Patent [19]

Bucalo

[11] 3,909,363

[45] Sept. 30, 1975

[54] METHOD FOR TESTING BODY FLUIDS SUCH AS SEMEN

[75] Inventor: Louis Bucalo, Holbrook, N.Y.

[73] Assignee: Inventors In Ventures, Inc., New York, N.Y.

[22] Filed: Sept. 11, 1972

[21] Appl. No.: 287,771

[52] U.S. Cl. ...... 195/103.5 R; 23/230 B; 23/253 R; 23/259; 195/127
[51] Int. Cl.² .......................................... C12K 1/04
[58] Field of Search ................. 23/230 B, 253 TP; 195/103.5

[56] References Cited

UNITED STATES PATENTS

| | | | |
|---|---|---|---|
| 2,633,410 | 3/1953 | Beckley | 23/230 B |
| 2,671,715 | 3/1954 | Beckley | 23/230 B |
| 3,438,737 | 4/1969 | Atkinson | 23/230 B |

OTHER PUBLICATIONS

Todd-Sanford "Clinical Diagnosis by Laboratory Methods," W. B. Saunders Co., Phil. 1969; p. 1,201; Group 171.
"Reduction of Colour Fading in the PNPH Test for DNA in Bovine Spermatozoa " by Grogan in Nature, Vol. 206, No. 4983, 1965 May, p. 1,156.
"Techniques of Histo-and Cytochemistry," by Glick; Interscience Pub., N.Y., 1949, pp. 65–66.
"A Practical Manual of Medical & Biological Staining Techniques" by Gurr; Interscience Publishers Inc., N.Y., 1956, pp. 347–348.
Gradwohl's "Clinical Laboratory Methods & Diagnosis" Vol. 2; C. V. Mosby Co., St. Louis, 1970, pp. 1,902–1,910; Group 171.

Primary Examiner—Joseph Scovronek
Assistant Examiner—Arnold Turk
Attorney, Agent, or Firm—Steinberg & Blake

[57] ABSTRACT

A method for determining the effectiveness of an interruption in the vasa deferentia or the effectiveness of the production of aspermia, total or partial inhibition of spermatogenesis (sperm production in the testes) or sperm transport through the epididymides or vasa deferentia by chemical (drug) or other (for example, radiological or immunological or agglutination or temperature) means by reacting semen with an agent or combination of agents which respond to visually or photometrically indicate the presence of sperm in the semen or the presence in the semen of a fluid which carries sperm, if any, and which can only be present if the vas interruption is incomplete. A device which is used according to the method for determining the presence of sperm includes a filter which carries (e.g. by impregnation or coating) an agent or combination of agents which react to indicate the presence of DNA, so that if sperm is present in the semen the DNA therein will provide through the reaction of the agent a visual or photometric indication of the presence of sperm, and/or an agent (or agents) which react with specific constituents in the fluids secreted or produced by the testes, the epididymides, or the vasa deferentia (for example, glycerylphosphorylcholine or glycosidases or carnitine) to give through the reaction a visual or photometric indication of the presence of these constituents in the semen.

4 Claims, 4 Drawing Figures

U.S. Patent   Sept. 30,1975   3,909,363

METHOD FOR TESTING BODY FLUIDS SUCH AS SEMEN

BACKGROUND OF THE INVENTION

The present invention relates to testing devices and methods.

In particular, the present invention relates to methods and devices for testing body fluids, such as semen, after the fluid has issued from its source in the body of a human being or other creature.

At the present time it is conventional to test semen for the purpose of determining male fertility. This is done by putting semen on a slide and looking at the semen through a microscope so that a skilled individual can determine from the quantity of living sperm which appear under the microscope the degree of male fertility. However, this procedure is tedious and time consuming as well as expensive.

Moreover, even this latter procedure will not solve certain problems which are encountered in the testing of a body fluid such as semen. It is possible at the present time to prevent conception by procedures according to which the flow of fluid through the vas deferens is interrupted. Semen is made up of fluids which come from two primary sources. The first fluid source is the male accessory glands (prostate, seminal vesicles, bulbourethral) and the second fluid source is the testes, epididymides, and vasa deferentia. The fluid which normally flows through the vasa, to be combined with the fluid from the prostate, seminal vesicles, and bulbourethral glands, will normally carry sperm. However, if it should happen that for some reason there are no sperm, it is still possible for the vasa interruption to be incomplete with fluid flowing through the vasa to be added to the semen but without sperm, and if under these conditions the fluid is tested in the normal way on a slide and viewed through a microscope, the absence of sperm will not necessarily give a true indication of a complete interruption of the vasa.

SUMMARY OF THE INVENTION

It is accordingly a primary object of the present invention to provide a method and apparatus for determining the effectiveness of an interruption in the vasa deferentia.

Thus, it is an object of the present invention to provide a method and apparatus capable of indicating the presence or absence of sperm in semen in a manner which is convenient, rapid, and far less expensive than any conventional procedures heretofore used for this purpose.

Furthermore, it is an object of the present invention to provide a method which can be used to determine whether or not there is present in the semen any fluids from the vas side of the body, namely testicular, epididymal, and vasal fluids, even if the latter components of the semen do not carry sperm.

It is furthermore an object of the present invention to provide methods and apparatus of the above type capable of giving an immediate visual or photometric indication of the results of the test procedure.

Yet another object of the present invention is to provide a simple, inexpensive device which can be easily operated for the purpose of detecting the presence of DNA in a fluid.

According to the method of the invention the effectiveness of an interruption in the vasa deferentia is determined by reacting semen with an agent which responds visually or photometrically indicating the presence of sperm in the semen or the presence in the semen of a fluid which carries sperm, if any, and which can only be present if the vasa interruption is incomplete.

For the purpose of testing whether or not the semen contains the fluid which carries the sperm, if any, the semen is collected in a suitable container, and an agent which reacts with the fluid if it is present is then added to the semen, the indication preferably being a visual or photometric indication such as a change in color. For the purpose of detecting the presence of sperm, it is preferred to use a filter which carries an agent which responds to the presence of DNA in the semen for giving a visual indication such as a color indication.

BRIEF DESCRIPTION OF DRAWINGS

The invention is illustrated by way of example in the accompanying drawings which form part of this application and in which.

DESCRIPTION OF PREFERRED EMBODIMENTS

According to the present invention methods and apparatus are provided for detecting whether or not there is present in semen either one or both of a pair of constituents thereof. These constituents, the presence of which is detected according to the invention, are sperm and the fluid which carries the sperm, if any.

Considering first the detection of the presence of sperm in the semen, the present invention takes advantage of the fact that sperm is the only constituent in normal semen which contains DNA. Thus, according to the present invention methods and apparatus are provided for detecting the presence of DNA in the semen, and if the test results show the presence of DNA then it is known that sperm is also necessarily present in the semen.

It has been found that various reagents are available to react with DNA in a fluid such as semen for giving a visual or photometric indication, namely a color indication, of the presence of DNA. Thus, it is possible to combine together carbol fuchsin and methylene blue to form from these constituents a reagent which acts as a stain to give a characteristic blue color in the event that DNA is present in the semen. Another reagent which may be used for the same purpose is aniline blue plus eosin B and phenol, which gives a navy blue color, or Feulgen stain which can give a purple-red color. Any of the latter reagents may be selected to react with semen for giving a characteristic color indication when DNA is present in the semen. Thus, if any one of the above reagents is reacted with the semen and there is no color change, then it is known that there is no sperm in the semen. It thus becomes possible with such a method to determine the effectiveness of an interruption in the vas deferens. Where an operation has been performed to prevent conception by interrupting the flow of fluid through the vasa deferentia, it is necessary to check after the operation as to whether or not an effective interruption has been achieved. By carrying out the above tests it is possible to detect very readily, in an inexpensive and highly convenient manner, whether or not the interruption in the vas deferens is complete.

Figure 1:
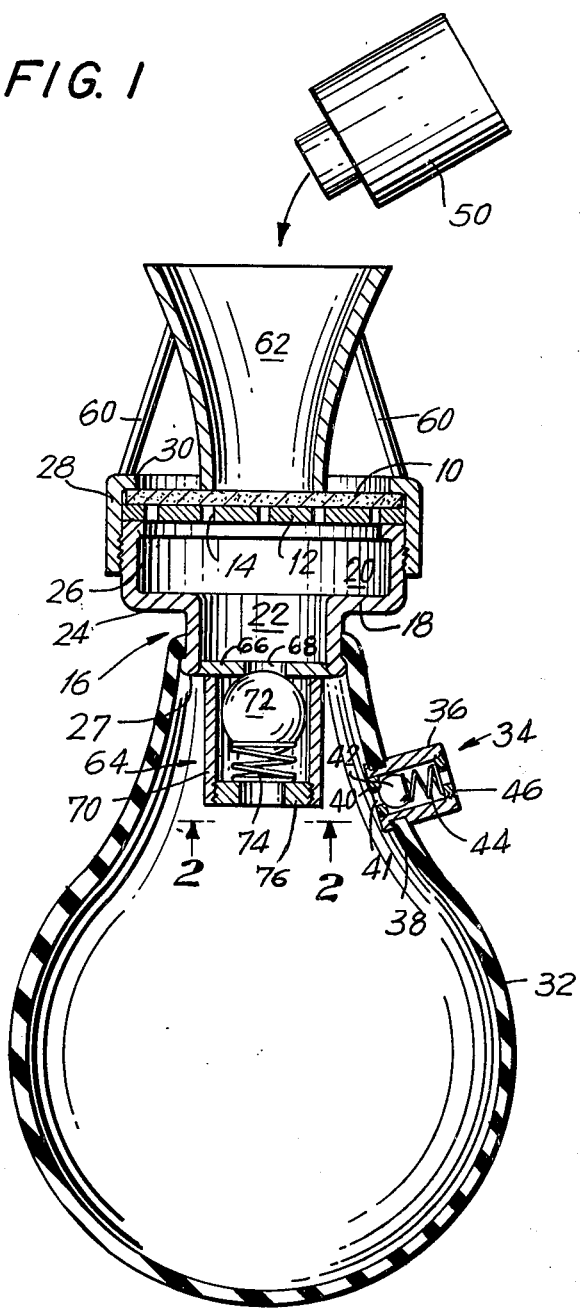
FIG. 1 is a sectional elevation of a device according to the invention for detecting the presence of sperm in semen.

FIG. 1 illustrates a device according to the invention for carrying out the above test. Referring to FIG. 1, there is illustrated therein a filter 10 in the form of a suitable sheet material which may have any desired configuration and which carries any of the above reagents. For this purpose the filter may be initially pretreated in any way such as by being coated or impregnated with the reagent. In practice any of the above reagents can remain in a perfectly dry condition in the filter 10 so that in order to carry out the test the operator will simply take a filter which has been impregnated or coated with one of the above reagents and will then use it with a device of the type shown in FIG. 1. As may be seen from FIG. 1, the filter 10 is supported on an apertured plate 12 which may be made of any suitable plastic or metal which is formed with a plurality of apertures 14. These apertures are schematically indicated in FIG. 1. The perforated plate 12 has a relatively large number of these apertures 14 so that there is no difficulty in drawing substantially all of the semen deposited on the filter through the latter and through the apertures 14 to the side of the plate 12 which is opposite from the filter 10.

The apertured plate 12 forms part of a support means 16 which is used to support the filter 10 in such a way that a fluid such as semen can be drawn through the filter. This support means includes, in addition to the apertured plate 12, the tubular component 18 which has a hollow portion 20 of relatively large diameter as compared to the smaller diameter portion 22 thereof which is joined to the larger diameter portion 20 by way of the annular wall 24 which is integral with the portions 20 and 22. At its top end, as viewed in FIG. 1, the portion 20 has an inwardly directed lip 26 on which the plate 12 rests at its outer periphery, the diameter of the plate 12 being equal to the outer diameter of the large diameter portion 20 of the support means 16. The bottom end of the smaller diameter of the portion 22 has an outwardly directed lip 27.

The larger diameter portion 20 is provided with external threads next to the lip 26, and a ring 28 is threaded onto the larger-diameter portion 20 of the support means 16. If desired a snap-on connection may be used instead of a threaded connection. The ring 28 of the support means 16 is long enough to extend beyond the portion 20 and the plate 12 as well as the filter 10. At its top end the ring 28 has an inwardly directed lip 30 which overlaps the periphery of the filter 10.

The semen which is to be tested is directed through a central portion of the filter 10. For this purpose the ring 28 fixedly carries a plurality of small rods or bars 60 which extend upwardly from the ring 28 in the manner shown in FIG. 1 and which are distributed about the axis of the ring 28. At their top ends the bars 60 are fixed to a funnel element 62 which has a lower end at the same elevation as the bottom surface of the lip 30 so that the lower end of the funnel 62 will engage the top surface of the filter 10 defining a circular area inwardly of the edge of the filter 10 through which the semen will be drawn. The ring 28 together with the rods 60 and the funnel 62 may be made of a single body of plastic or may be made of any suitable metal, for example, with all the parts joined to each other as by being welded or otherwise fixed to each other.

Thus, with the device of FIG. 1 as thus far described, in order to make a test the operator will unscrew the ring 28 from the threads of the portion 20, place an unused filter 10 which has previously been treated with one of the above agents on the apertured plate 12, and will then replace the ring 28 on the portion 20, threading the ring 28 onto the threads of the portion 20 until the lip 30 clamps the filter 10 and the plate 12 between the lip 30 and the lip 26, and of course at this time the bottom end of the funnel 62 will engage the top surface of the filter 10.

A squeeze-bulb 32 of any suitable resilient plastic, rubber, or the like, is snapped over the lip 27 so as to be assembled in a fluid-tight manner with the smaller-diameter portion 22 of the support means 16. The interior of the squeeze-bulb 32 communicates with the interior of the portions 20 and 22 through a one-way valve means 64.

Figure 2:
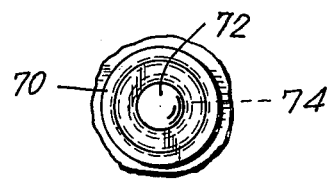
FIG. 2 is sectional elevation taken along line 2—2 of FIG. 1 in the direction of the arrows and illustrating part of a valve structure.

Thus, as may be seen from FIGS. 1 and 2, the valve means 64 includes a wall 66 extending across the smaller-diameter portion 22 and formed with an opening 68. A tubular valve housing 70 extends downwardly from the wall 66 and accommodates in its interior the ball valve member 72 and the spring 74 which urges the ball valve member 72 to its position closing the opening 68. The lower internal portion of the valve housing 70 is threaded so as to receive a threaded ring 76 which engages the spring 74 and adjusts the force with which the ball valve 72 is urged to its closed position closing the opening 68. The ring 76 is externally threaded so as to be capable of being threaded into the housing 70 engaging the spring 74 to adjust the force thereof as well as holding the components of the valve in their assembled condition. Therefore, any semen which flows past the one-way valve means 64 can flow freely through the ring 76 into the bulb 32.

The squeeze-bulb 32 also carries a one-way valve means 34 which includes an outer tubular housing 36 formed with a groove 38. The wall of the squeeze-bulb is formed with an opening whose diameter is equal to the smallest diameter of the groove 38, and the wall portion of the bulb 32 which defines the opening is snapped into the groove 38 to provide in this way a fluid-tight connection between the valve means 34 and the squeeze-bulb 32. The housing 36 fixedly carries at its left end, as viewed in FIG. 1, an apertured valve seat body 40 having an aperture 41 which is normally closed by the ball valve member 42. This valve member 42 is urged to its closed position by the spring 44 which engages the externally threaded ring 46 which is threaded into the interior of the housing 36. Thus, the one-way valve means 34 is substantially identical with the one-way valve means 64 except that the valve means 34 is carried by the wall of the squeeze-bulb 32.

Thus, with this construction when the operator squeezes the squeeze-bulb 32 in order to reduce the volume thereof, the air within the bulb 32 can only flow out through the valve means 34 to the outer atmosphere, the increased pressure of the air serving to contribute to the closing of one-way valve means 64. On the other hand, when the operator releases the squeeze-bulb 32 so that it assumes its initial configuration as shown in FIG. 1, air will flow through the funnel 62 and the filter 10 as well as through the apertures of the plate 12, the one-way valve means 64 at this time automatically opening to admit the air into the interior of the squeeze-bulb 32, and thus the semen deposited on the filter 10 will be drawn through the latter at the central area limited by the bottom end of the funnel 62.

FIG. 1 schematically illustrates a container 50 in which the semen which is to be tested is collected. If desired the semen may be collected in a condom upon ejaculation, and the semen may then be directed into the funnel 62 directly from such a condom. However, semen may be collected directly in the bottle 50 by masturbation. It has been found from experience that 95 percent of the male population will agree to collection of semen in this manner, although use of a condom is also possible. Thus whether by way of a condom or by way of the container 50, the semen is dropped into the funnel 62 so as to be guided thereby through a circular area at the center of the filter 10. With the semen thus deposited on the filter 10, the operator will manipulate the squeeze-bulb, compressing and releasing it as many times as required to draw substantially all of the semen through the filter 10.

With this arrangement if there are any sperm in the semen, the DNA of the sperm will react with the testing reagent carried by the filter 10 to give a characteristic color indication of the presence of the sperm, so that by way of a simple change in color of the filter 10 it is possible to detect the presence of sperm in the semen.

It is to be noted that with the above arrangement this change of color if it occurs will be limited to the central circular region defined by the bottom of the funnel 62, so that there will be a contrast with the color of the filter beyond the circular area through which the semen is drawn. However, it is to be noted that the presence of such a circular area is not at all critical. The detecting reagent may be arranged in or on the filter according to any preselected pattern such as, for example, a pattern of concentric rings, a triangular configuration, or in a configuration spelling out any desired word or letter so that if the letter S appears in the characteristic color it will be known that the sperm are present. In other words, instead of treating the entire filter and limiting the flow of the semen through a part of the area thereof to provide a contrast with the remainder of the filter it is possible to limit the treatment of the filter with the reagent, by impregnation or coating, for example, only to an area having a given pattern so that with such an arrangement even if the semen is drawn through the entire filter, only the part of the filter which carries the reagent will give a color according to the pattern with which the reagent is distributed at the filter.

Therefore, with this simple construction shown in FIGS. 1 and 2 it is possible to practice the method of the invention so as to readily detect the presence of sperm, and it will be apparent that the method of the invention and the device of FIG. 1 may be used even by unskilled individuals in the privacy of their own homes.

After the device is used it is possible to remove and clean the squeeze bulb 32 by washing it out, and the same is true of course of the remainder of the device. Thus the ring 28 is unscrewed, the filter 10 is removed and either discarded or saved if it indicates the presence of sperm, and the remainder of the structure is suitably cleaned, as by washing, and then reassembled for future use.

As has been indicated above, it is possible in certain individuals to have an incomplete interruption of the vas without any sperm being present in the semen. With such individuals there will nevertheless still be in the semen the fluids which normally have the sperm suspended therein. These are testicular, epididymal, and vasal fluids.

In order to detect in the semen the presence of a fluid having these latter constituents, advantage is taken of the fact that these fluids form the only part of the semen which contains glycosidase enzymes. More specifically, these fluids normally added to the semen from the vas contain alpha or beta mannosidases. Thus, this latter class of enzyme can only be present in the semen if it contains fluid from the branch which includes the testes, the epididymides, and vasa deferentia. Advantage may also be taken of the fact that these fluids form the only part of the semen which contains glycerylphosphorycholine and carnitine.

Reagents may be used to react with these constituents, namely glycosidases, glycerylphosphorylcholine (hereinafter referred to as GPC), and carnitine. It has been found that mannoside specifically reacts with mannosidase and that glucoside specifically reacts with glucosidase. Moreover, it has been found that there are reagents which will react specifically with GPC and with carnitine. These reactions may be used, with or without the presence of a suitable chromogen, to produce a characteristic color if glycosidase, GPC, or carnitine is present in the semen. Thus, in order to carry out tests of this type, the semen is collected in a suitable container and one or more of the above reagents is added to the semen to react therewith giving a color indication of the presence of fluid which carries sperm, if any.

Figure 3:
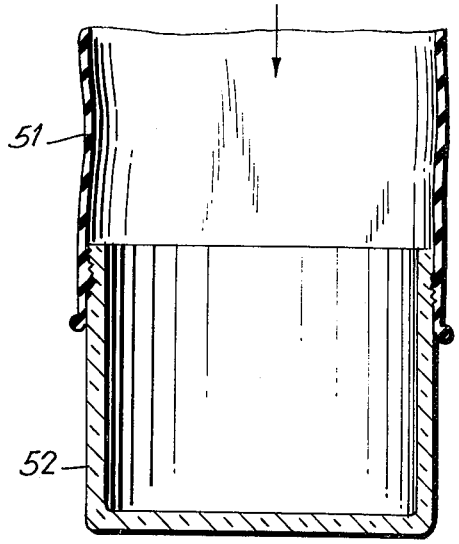
FIG. 3 illustrates in section a container in which semen may be collected.
Figure 4:
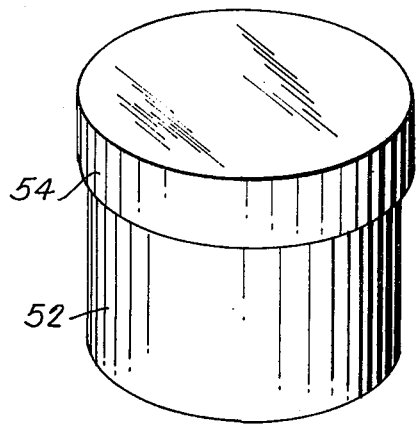
FIG. 4 shows the container of FIG. 3 closed by a suitable cover.

Referring to FIG. 3, there is fragmentarily illustrated therein a condom 51 in which the semen is normally deposited. The open end of the condom 51 is placed around a container such as the jar 52 made of a suitable transparent glass or plastic. After the semen is deposited in the jar 52, it may be closed by a suitable lid 54, shown in FIG. 4. This lid may be in the form of a simple cover which is threaded onto the top open end of the jar 52. In this way the semen is collected in the transparent container 52 which may be delivered to a suitable laboratory, physician's office, or the like. In order to carry out the test the cover 54 is removed and either one of the above reagents is added to the semen. It is then possible to detect a color change which if it occurs results in a characteristic color indicating the presence of the substance which can only be present if the interruption in the vas deferens is incomplete.

While it is of course possible to deposit the reagent directly into semen while it is in the condom, the condom is inconvenient to handle and transport and it is not sufficiently clear to give a convenient indication of a change in color, so that it is preferred to transfer the semen from the condom to a container such as the container 52 which is made of a clear completely transparent glass or plastic through which any change in color can easily be detected.

As is apparent from the above description, any of the tests of the invention for indicating the presence or absence of sperm may indicate that the interruption in the vasa is incomplete but will not indicate in a fully reliable manner that the interruption in the vasa is indeed complete. Thus, even if tests indicate that no sperm is present in the semen, it may still be possible that the interruption in the vasa is incomplete if it happens that the individual for some reason does not produce sperm, so that fluids from the vas side are added to the semen without sperm. It is only by carrying out the second type of test for indicating the presence of the fluid in which sperm is normally suspended that a fully reliable determination of the effectiveness of the vasa interruption can be achieved. On the other hand, the indication of the presence of sperm with the first type of test will indicate in itself that the interruption is incomplete and that the operation to interrupt the vasa has not been successful.

Moreover, it is possible to interrupt the vasa in a reversible manner, so that after a given period of time a male is again in a condition for conception. After such a reversal has been carried out to reestablish the flow of fluid through the vasa, there will be a certain elapse of time before sperm are again present in the semen, and the first type of test referred to above, together with the device of FIG. 1, may be used to indicate when sperm again are present in the semen.

The following are some examples of the present invention:

EXAMPLE I

Semen was collected from an adult human male just before this individual was subjected to an operation to interrupt the vasa. This semen was deposited on a filter 10 which has previously been treated with aniline blue. After operating the squeeze bulb 32 in order to draw the semen through the filter 10 with the device of FIG. 1, the circle appeared clearly and sharply in the characteristic color of the reagent. Additional semen was then collected from the same individual prior to the operation and placed in the container 52. A reagent formed of paranitrophenol (which is yellow) linked to alpha or beta-mannoside (when so linked the reagent is colorless) was then added to this semen. A yellow color appeared as a result of the linkage of the mannoside with mannosidase, cleaving off the yellow paranitrophenol. Then this particular individual was subjected to the operations to interrupt the vasa, and 6 weeks after the operation the above procedures were repeated with the same individual. At this time the circle did not appear on the filter when the semen was drawn in the manner described above through the filter 10, and the semen in the container 52 did not change its color, so that it was known that the interruption of the vasa was complete.

EXAMPLE II

Two months after an individual has undergone an operation to interrupt the vasa, semen was collected from this individual and drawn with the device of FIG. 1 through a filter 10 which has previously been treated with Feulgen stain which had been arranged in or on the filter. No color change of any type and no appearance of the circle or any other pattern appeared in or on the filter. Immediately thereafter semen collected from another male adult who had not undergone an operation to interrupt the vasa was drawn with the device of FIG. 1 through an identical filter 10 treated previously in precisely the same way, and in this case the circle clearly appeared in the color which is characteristic for this reagent. Additional semen was then collected from the first individual who had undergone the operation and placed in the container 52. The paranitrophenol-mannoside reagent was then added to the semen in the container 52 and no color change was detected. Then additional semen was collected from the second individual who had not undergone the operation, and this latter semen was placed in another container 52. The same reagent was added to this latter semen and there was an immediate changing of the color of the semen into the yellow color which is characteristic for the reaction with mannosidase. Thus, in this case also it was determined that the vas interruption was complete.

EXAMPLE III

Four days after a male adult had undergone an operation to interrupt the vasa, semen was collected from this male adult and drawn with the device of FIG. 1 through a filter 10 which had previously been treated with the reagent formed by the combination of carbol fuchsin and methylene blue. The circle clearly appeared in its characteristic color, but since it was known that a longer period after the operation is normally required to terminate the presence of sperm in the semen even with a successful operation, it was decided to wait and repeat the test at a later time. This very same test was repeated with the same individual one month after the operation and the circle did not appear. Immediately thereafter semen from an individual who had not undergone the operation was drawn through a filter treated in the very same way, utilizing the device of FIG. 1, and the circle clearly appeared. Then semen from the individual who had undergone the operation was placed in a container 52 and the paranitrophenol-alpha mannoside reagent was added, without any change in color being detected. Semen from the second individual who has not undergone the operation was collected and placed in a second container 52, and upon adding the same reagent a color change to yellow was immediately apparent. It was therefore determined that even though the circle appeared with the first individual who had undergone the operation, when the test was carried out four days after the operation, nevertheless the vasa interruption was complete.

It is apparent from the above description that with the tests and apparatus of the invention it is possible to detect the presence or absence of sperm in semen. When the tests are made to determine the effectiveness of an operation for interrupting the flow of fluid through the vasa, a test which indicates the presence of sperm will indicate that the interruption in the vasa is not complete, unless the test is carried out in a relatively short time after the operation. Under these conditions it becomes unnecessary to proceed further. However, if there is no indication of the presence of sperm, in order to provide a fully reliable determination of the effectiveness of the interruption one should proceed further to test for the presence of the fluid which normally carries the sperm, and if this latter test shows that this latter fluid is not present, then it is clear that the vasa interruption is complete.

What is claimed is:

1. A method for determining the effectiveness of an interruption in the vasa deferentia, comprising reacting the semen with a glycoside selected from the group consisting of glucoside and mannoside to determine the presence or absence therein of the corresponding glycosidase enzymes which are contained in a fluid which normally carries sperm from the vas, the absence of such glycosidase enzymes confirming the effectiveness of the vasa interruption.

2. The method of claim 1 and wherein said glycoside is linked to a coloring agent which upon reaction of said glycoside with the corresponding glycosidase enzyme visually indicates the presence of said glycosidase enzyme.

3. The method of claim 1 and wherein said glycoside is mannoside which reacts with a mannosidase enzyme in the fluid.

4. The method of claim 1 wherein the semen is collected in a container to which said glycoside is added to contact the semen and react with said glycosidase enzymes in said fluid if the latter is present in the semen.

* * * * *